US 12,554,513 B2

(12) United States Patent
Trostén et al.

(10) Patent No.: US 12,554,513 B2
(45) Date of Patent: Feb. 17, 2026

(54) UPDATING AN EDGE NODE OF A PROCESS CONTROL SYSTEM

(71) Applicant: ABB Schweiz AG, Baden (CH)

(72) Inventors: Anders Trostén, Västerås (SE); Nori Ahari, Västerås (SE)

(73) Assignee: ABB Schweiz AG, Baden (CH)

(*) Notice: Subject to any disclaimer, the term of this patent is extended or adjusted under 35 U.S.C. 154(b) by 253 days.

(21) Appl. No.: 17/757,127

(22) PCT Filed: Jun. 24, 2020

(86) PCT No.: PCT/EP2020/067600
§ 371 (c)(1),
(2) Date: Jun. 9, 2022

(87) PCT Pub. No.: WO2021/121674
PCT Pub. Date: Jun. 24, 2021

(65) Prior Publication Data
US 2023/0014080 A1 Jan. 19, 2023

Related U.S. Application Data

(60) Provisional application No. 62/949,189, filed on Dec. 17, 2019.

(51) Int. Cl.
G06F 9/448 (2018.01)
G06F 8/35 (2018.01)
G06F 8/41 (2018.01)

(52) U.S. Cl.
CPC .............. G06F 9/4488 (2018.02); G06F 8/35 (2013.01); G06F 8/433 (2013.01)

(58) Field of Classification Search
CPC .......... G06F 8/35; G06F 8/433; G06F 9/4488
See application file for complete search history.

(56) References Cited

U.S. PATENT DOCUMENTS 6,252,851 B1 * 6/2001 Siu ..................... H04L 47/193
370/428
9,535,685 B1 1/2017 Wang et al.
(Continued)

OTHER PUBLICATIONS

Kostas Kolomvatsos, "An intelligent, uncertainty driven management scheme for software updates in pervasive IoT applications", Jun. 2018, pp. 116-131 (Year: 2018).*

(Continued)

Primary Examiner — Wei Y Mui
Assistant Examiner — Amir Soltanzadeh
(74) Attorney, Agent, or Firm — Whitmyer IP Group LLC

(57) ABSTRACT

A method, edge node application investigator, computer program and computer program product for for updating an edge node of a process control system using an information model for the edge node, where the information model representing the edge node as an object to which one or more application objects are linked, which application objects represent applications that are provided for being run by the edge node as well as to a process control system including such an edge node application investigator. The edge node application investigator compares applications of the edge node with the application objects in the information model and changes the applications of the edge node, if there is a deviation between the applications of the edge node and the application objects of the information model, so that the applications of the edge node correspond to the application objects of the information model.

22 Claims, 6 Drawing Sheets

(56) References Cited

U.S. PATENT DOCUMENTS

| | | | | |
|---|---|---|---|---|
| 10,015,183 | B1* | 7/2018 | Neil | H04L 63/1425 |
| 2003/0217357 | A1* | 11/2003 | Parry | G06F 8/65 |
| | | | | 719/310 |
| 2006/0026304 | A1* | 2/2006 | Price | G06F 8/65 |
| | | | | 710/8 |
| 2017/0060574 | A1* | 3/2017 | Malladi | H04W 4/70 |
| 2017/0262274 | A1 | 9/2017 | Vangelov | |
| 2019/0026712 | A1* | 1/2019 | Terada | G06Q 20/12 |
| 2019/0132205 | A1* | 5/2019 | Du | H04L 41/0816 |
| 2019/0306124 | A1* | 10/2019 | Bild | H04L 9/0833 |
| 2019/0334954 | A1* | 10/2019 | Manamohan | H04L 63/0823 |
| 2019/0373649 | A1* | 12/2019 | Magadevan | H04W 92/18 |
| 2020/0065082 | A1* | 2/2020 | Nightingale | G06F 21/577 |
| 2020/0076927 | A1* | 3/2020 | Barthur | H04L 41/0893 |
| 2020/0177703 | A1* | 6/2020 | Panda | G16Y 30/00 |
| 2023/0362200 | A1* | 11/2023 | Crabtree | G06F 16/2477 |

OTHER PUBLICATIONS

International Preliminary Report on Patentability; Application No. PCT/EP2020/067600; Issued: Feb. 9, 2022; 7 Pages.

International Search Report and Written Opinion of the International Searching Authority; Application No. PCT/EP2020/067600; Completed: Sep. 18, 2020; Mailing Date: Oct. 5, 2020; 14 Pages.

Written Opinion of the International Preliminary Examing Authority; Application No. PCT/EP2020/067600; Issued: Nov. 10, 2021; 6 Pages.

Anonymous; "Software deployment—Wikipedia" ; Nov. 25, 2019; Retrieved from the Internet; URL:https://en.wikipedia.org/w/index.php; 4 Pages.

European Office Action; Application No. EP20734710.5; Completed: Mar. 4, 2024; 9 Pages.

* cited by examiner

UPDATING AN EDGE NODE OF A PROCESS CONTROL SYSTEM

TECHNICAL FIELD

The present invention relates to a method, computer program and computer program product for updating an edge node of a process control system as well as to an edge node application investigator and process control system comprising such an edge node application investigator.

BACKGROUND

Object based computer systems are today used for controlling industrial processes.

In this case the objects may be provided according to a first data process control format, such as a format that is based on the COM technology. A digital object then represents a real-world object used in the control and this digital object typically has a number of aspects.

These process control objects are typically kept in a closed environment in order to avoid negative influences on the process control.

If new software with a new function is to be installed and integrated into the above-mentioned type of system that runs core process functionality, the following situation is at hand:

Each new function needs to comply to the same software technology as the underlying system supports.

Flaws of each new function may jeopardize the stability of the control system.

The life cycle of each new function is tightly coupled with the life cycle of the core control system.

This results in unwillingness from the customer side to upgrade existing software and to install new software that adds functions.

It is thus of interest to simplify the adding of software to be used in a process control system. It is additionally of interest to also change such added software in a simple and efficient way.

It is therefore of interest to simplify the change of software that is to be run in a process control system without jeopardizing the control.

SUMMARY

Aspects of the present invention are directed towards simplifying the change of software that is to be run in a process control system.

This object is according to a first aspect achieved through a method for updating an edge node of a process control system using an information model for the edge node, where the information model represents the edge node as an object to which one or more application objects are linked, which application objects represent applications that are provided for being run by the edge node, the method being performed by an edge node application investigator and comprising:

comparing applications of the edge node with the application objects in the information model, and changing the applications of the edge node, if there is a deviation between the applications of the edge node and the application objects of the information model, so that the applications of the edge node correspond to the application objects of the information model.

The object is according to a second aspect achieved through an edge node application investigator for updating an edge node of a process control system using an information model for the edge node, where the information model represents the edge node as an object to which one or more application objects are linked, which application objects represent applications that are provided for being run by the edge node, the edge node application investigator comprising a processor and memory and the memory comprising computer instructions executable by the processor, whereby the edge node application investigator is operative to:

compare applications of the edge node with the application objects in the information model, and change the applications of the edge node, if there is a deviation between the applications of edge node and the application objects of the information model, so that the applications of the edge node correspond to the application objects of the information model.

The object is according to a third aspect achieved through a process control system comprising an edge node and an edge node application investigator for updating the edge node using an information model for the edge node, where the information model represents the edge node as an object to which one or more application objects are linked, which application objects represent applications that are provided for being run by the edge node, the edge node application investigator being configured to:

compare applications of the edge node with the application objects in the information model, and change the applications of the edge node, if there is a deviation between the applications of edge node and the application objects of the information model, so that the applications of the edge node correspond to the application objects of the information model.

The object is according to a fourth aspect achieved through a computer program for updating an edge node of a process control system using an information model for the edge node, where the information model represents the edge node as an object to which one or more application objects are linked, which application objects represent applications that are provided for being run by the edge node, the computer program comprising computer program code which when run in an edge node application investigator causes the edge node application investigator to:

compare applications of the edge node with the application objects in the information model, and change the applications of the edge node, if there is a deviation between the applications of edge node and the application objects of the information model, so that the applications of the edge node correspond to the application objects of the information model.

The object is according to a fifth aspect achieved through a computer program product for updating an edge node of a process control system using an information model for the edge node, where the information model represents the edge node as an object to which one or more application objects are linked, which application objects represent applications that are provided for being run by the edge node, the computer program product comprising a data carrier with computer program code configured to cause an edge node application investigator to, when the computer program code is loaded into the edge node application investigator:

compare applications of the edge node with the application objects in the information model, and change the applications of the edge node, if there is a deviation between the applications of edge node and the application objects of the information model, so that the applications of the edge node correspond to the application objects of the information model.

According to a first variation of the first aspect, the changing of the applications provided for being run by the edge node if there is a deviation between the applications of the edge node and the application objects of the information model comprises updating an application of the edge node that deviates from a corresponding application object in the information model, so that it is aligned with the corresponding application object in the information model.

According to a corresponding variation of the second aspect, the edge node application investigator, when changing the applications provided for being run by the edge node if there is a deviation between the applications of the edge node and the application objects of the information model, is operative to update an application of the edge node that deviates from a corresponding application object in the information model, so that it is aligned with the corresponding application object in the information model.

The at least one application may be provided as a software module for being run by the edge node.

According to a second variation of the first and second aspects, the updating of an application may in this case comprise patching the software module.

According to a third variation of the first and second aspects, the updating of an application may alternatively comprise providing a new software module replacing a previous software module.

According to a fourth variation of the first and second aspects, the updating of an application may as yet another alternative comprise providing a new software module replacing a previous software module.

It is additionally possible that at least one application object that deviates from a corresponding application defines a relation to another application.

According to a fifth variation of the first aspect, the method may in this case comprise investigating if the relation is new and providing the other application for being run by the edge node if the relation is new.

According to a corresponding variation of the second aspect, the edge node application investigator may be further operative to investigate if the relation is new and provide the other application for being run by the edge node if the relation is new.

According to a sixth variation of the first and second aspects, the application object defines a number of types, where one type is relations, where the investigating of if the relation is new comprises investigating the type relations.

According to a seventh variation of the first and second aspects, the edge node information model is based on the JavaScript Object Notation data format.

According to an eighth variation of the first and second aspects, the at least one application is provided as a software module for being run by the edge node.

Furthermore, the process control system may comprise a core process control system comprising a process control server communicating with the edge node. The edge node may in this case be operative to keep data generated by the applications related to steady-state operation of the process from entering the core process control system.

The invention has a number of advantages. It provides a simple and flexible model that allows customers to install and upgrade individual applications that adds capabilities to an Industrial Control System without affecting the Core Industrial Control System. This allows the applications to be developed and evolved with a fast pace, disconnected from the lifecycle of the Core Industrial Control System. Capabilities can be added without affecting other capabilities.

BRIEF DESCRIPTION OF THE DRAWINGS

The present invention will in the following be described with reference being made to the accompanying drawings, where FIG. 1 schematically shows a core process control system operating an industrial process using process control devices, FIG. 2 schematically shows one realization of an object handling unit and a container stored in a server of the core process control system for handling objects according to a first data format, FIG. 3 schematically shows the process control server communicating with an edge node in the process control system, FIG. 4 schematically shows the edge node communicating with a cloud-based edge node application investigator, which in turn communicates with a browser, an edge node information model, and an application library, FIG. 5 schematically shows the edge node information model, FIG. 6 schematically shows some content of the edge node.

DETAILED DESCRIPTION

In the following, a detailed description of preferred embodiments of a will be given.

Figure 1:
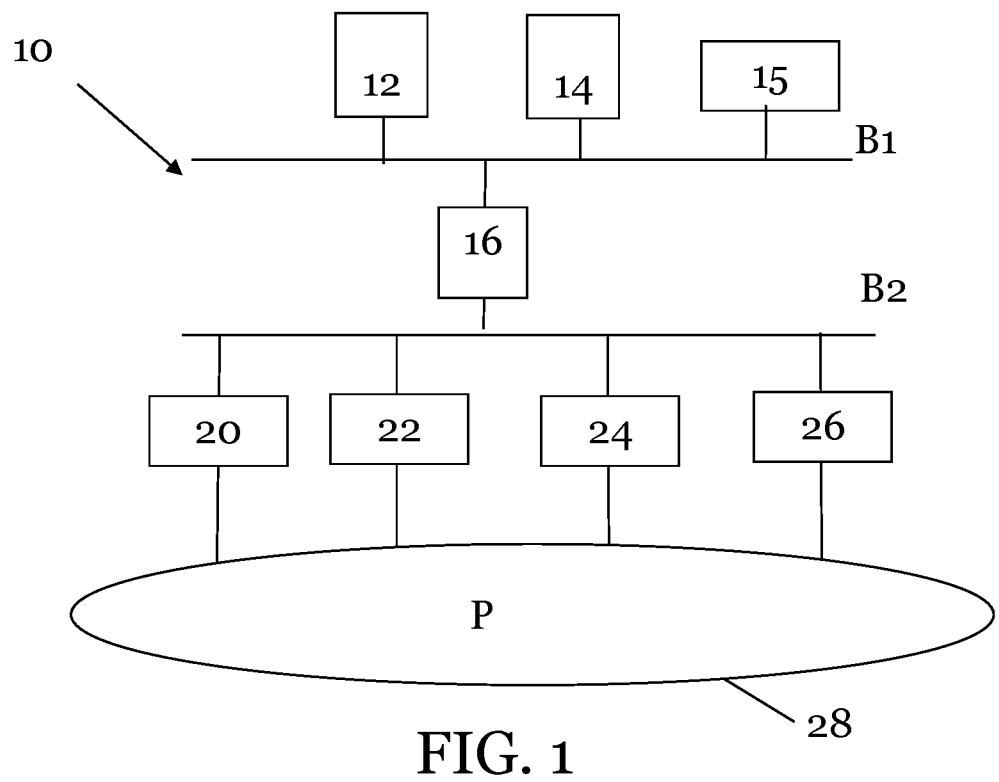

FIG. 1 schematically shows a core process control system 10, which core process control system may be provided in an industrial plant. The core process control system 10 implements computerized process control for controlling an industrial process P. Examples of industrial processes that may be controlled are electrical power generation, transmission and distribution processes, water purification and distribution processes, oil and gas production and distribution processes, petrochemical, chemical, pharmaceutical and food processes, and pulp and paper production processes. These are just some examples of processes where the system can be applied. There exist countless other industrial processes. The processes may also be other types of industrial processes such as the manufacturing of goods. A process may be monitored through one or more process monitoring computers, which communicate with a computer or server handling monitoring and control of the process.

In FIG. 1 the core process control system 10 therefore includes a number of process monitoring computers 12 and 14. These computers may here also be considered to form operator terminals and/or engineering terminals and are connected to a first data bus B1. There is furthermore a second data bus B2 and between the first and second data busses B1 and B2 there is connected a first control computer 16 that is a process control server. To the first data bus B1 there is also connected a communication interface 15 allowing communication with an edge node of or for the process control system.

To the second data bus B2 there is also connected a number of further devices 20, 22, 24 and 26. These further devices 20, 22, 24 and 26 are field devices, which are process interface devices that are interfaces to a process P being controlled. There is in this case a first 20, second 22, third 24 and fourth 26 field device. A field device is typically an interface via which measurements of the process are being made and to which control commands are given. The measurements may be measurements of physical properties related to the process P. A field device may as an example be a tank and another as an example a centrifuge. The process control server 16 may be involved in controlling the process P based on inputs from field devices, such as from sensors of field devices, and actuating the same or other field devices, such as valves, based on the inputs. The field devices and computers are all examples of process control devices that are also real-world objects involved in the control of the process P.

Figure 2:
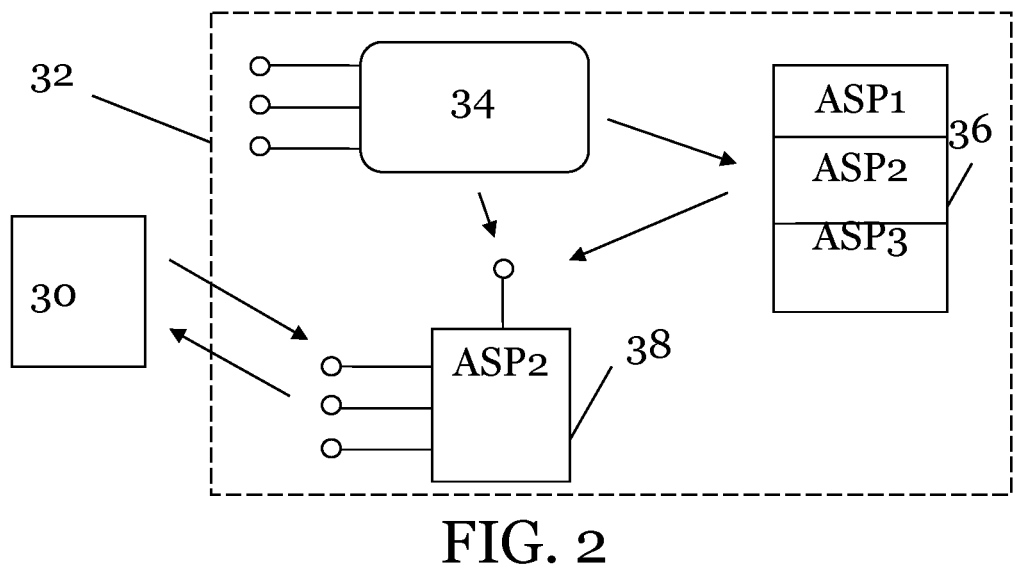

In order to control the process interface devices of a process, containers may be used, where there may be one container for each process interface device. FIG. 2 shows a block schematic of a first object handling unit 30 and object store 32 that are a part of the process control server 16, where the object store 32 comprises a container 34 according to a first data format, an aspect Asp2 38 and an aspect lookup table 36.

The container 34 is a so-called Component Object Model (COM) object having a number of interfaces, where three are shown in FIG. 2.

Through the container 34, the object handling unit 30 can invoke a function that is related to an aspect that is held by the container 34. The object handling unit 30 does this by querying the container 34 for an interface to this function, without knowing the identity of the application that implements the function for which it is seeking an interface. If the container has an aspect that supports the interface, then a reference to the interface is returned as some form of pointer to where that interface may be found.

The container 34 thus holds a number of aspects, of which one Asp2 38 is shown in FIG. 2. Each aspect, which may also be provided as a COM object, is related to a process interface device provided in the process control system section 10 or a group of process interface devices. An aspect represents one facet of this real-world object and is responsible for all operations on that facet of the object and its data. Thus, for a tank for example, one aspect could represent a physical location, another aspect could represent a blue print diagram of the tank, another a security descriptor for the tank, another aspect could represent a control for an operation of the tank and yet another aspect could represent documentation about the tank. The aspect that represents the facet has an association to a function of an application that can, referring to the above example, display the blue-print diagram control the operation of the pump or apply security settings. All aspects are created through an aspect category. The aspect category contains information that is shared between all instances of the category. Each aspect category refers to one aspect type. This aspect type describes the implementation of an aspect. The container does itself not hold any data, but data is provided in aspects or in relation to aspects. An aspect belongs to an aspect type (through its category) which lists the set of COM objects that implements the functionality of the aspect. This implementation is provided by an object, referred to as an Aspect System Object (ASO), which is a COM compliant object. Stated differently, the aspect type contains binding information between an aspect and the one or more applications that implement its functionality.

The container furthermore has access to an aspect lookup table 36, through which it may locate an aspect Thus, the first object handling unit 30 when needing to access a facet of the real-world object connects to the container 34 and requests an interface associated with said facet. The container then locates an aspect 36 associated with the facet via the aspect table 38, interrogates the aspect regarding its interfaces, receives information of an interface and returns the interface, through which the object handling unit may connect to the aspect for retrieving data, control the real-world object, etc.

The container is therefore a digital object that represents a real-world object in the process control system section and this digital object has a number of aspects pertaining to different facets of the object. As will be seen later the object is an original digital object that will be copied to an edge node. Moreover, this original digital object is provided according to a first process control data format, which data format in this case employs the COM technology with the digital object representing the real-world object and the aspects of this digital object being provided as a number of linked COM objects. This first process control data format is furthermore a proprietary data format.

Figure 3:
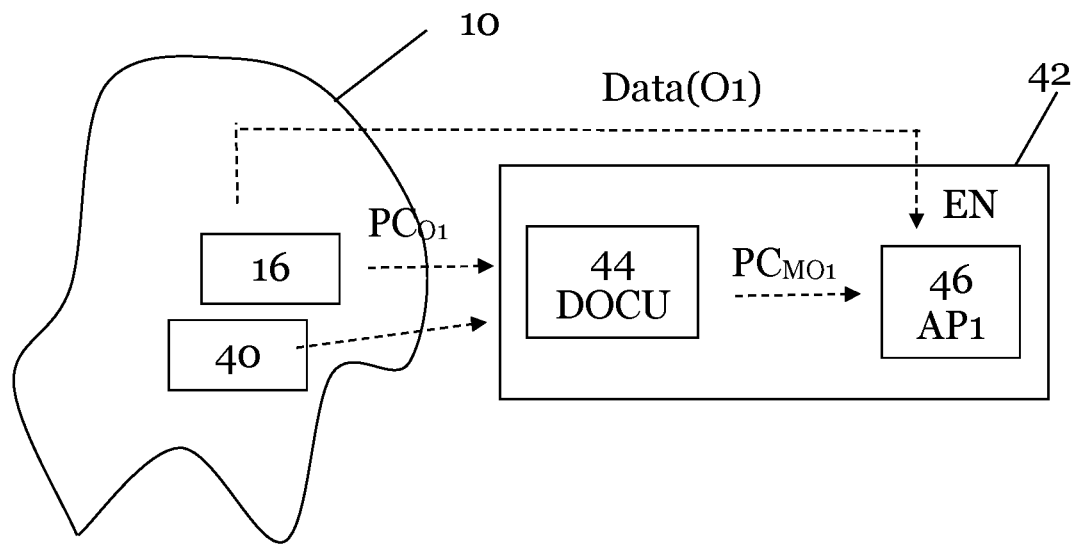

FIG. 3 schematically shows the core process control system 10 comprising the process control server 16. In the figure there is also an edge node EN 42. The core process control system 10 and edge node may be considered as being provided as parts of an enlarged process control system, where the process control server 16 communicates with a data object control unit DOCU 44 in the edge node 42. There is also an optional local measurement device 40 in the core process control system 10 communicating with the digital object control unit of the edge node. In the edge node 42 there is also a first application AP1 46. In the figure it can more particularly be seen that the process control server 16 sends a first digital object $PC_{O1}$ to the edge node 42, which first digital object is a processes control object according to the first process control data format. This object is converted into a modified first process control object $PC_{MO1}$ according to a second data format by the data object control unit DOCU 44 and supplied to the first application 46. Data(01) from the process control server 16 may then be directly sent from the server to the first application 46, where processing of this data Data(O1) related to the object is then performed based on the modified digital object using the second data format. The local measurement device 40 sends local measurement data related to the physical object for which the first digital object O1 is provided to the digital object control unit 44 of the edge node 42. These are measurements of devices in the core process control system, which are however not used in the control.

The modified objected MO1 may comprise a number of data models, such as a maintenance system model, a piping and instrumentation (P & ID) data model, a process control model, a device model, a log book model and a documentation data model.

The second data format is a format that can be understood by third-party developers. The second data format may be a format that is open for applications external to the process control system. The format may employ the JavaScript Open Notation (JSON) format. However also other formats, such as XML are possible. The format is thereby a format that third parties may be able to use in developing applications for the process control system. Moreover, the modified object MO1 comprises a number of data models corresponding to the aspects of the original object. These models may comprise at least one process control model defining how the object is used in the process control.

The digital object control unit 44 thus converts the aspects of the first data format into data models. This may be done through converting each aspect into a corresponding separate JSON file defining the data model. This may be done through creating a separate JSON file for the object level, which file comprises links to the different individual data model files. The digital object control unit 44 may additionally set up rules for data model usage. The rules may comprise rules regarding dependencies of the data models and rules regarding how the data defined by the data models is to be used. These rules may be stored as one or more separate JSON files to which the object level file refers, or they may be included in the object level file.

In this way it is possible for a third party to provide applications that can be used in the process control system, and this is also done without jeopardizing the core process control system.

However, it is also of interest to simplify the way applications are updated and changed. Aspects of the invention are concerned with this and will be described with reference being made to FIGS. 4, 5, 6, 7 and 8.

Figure 4:
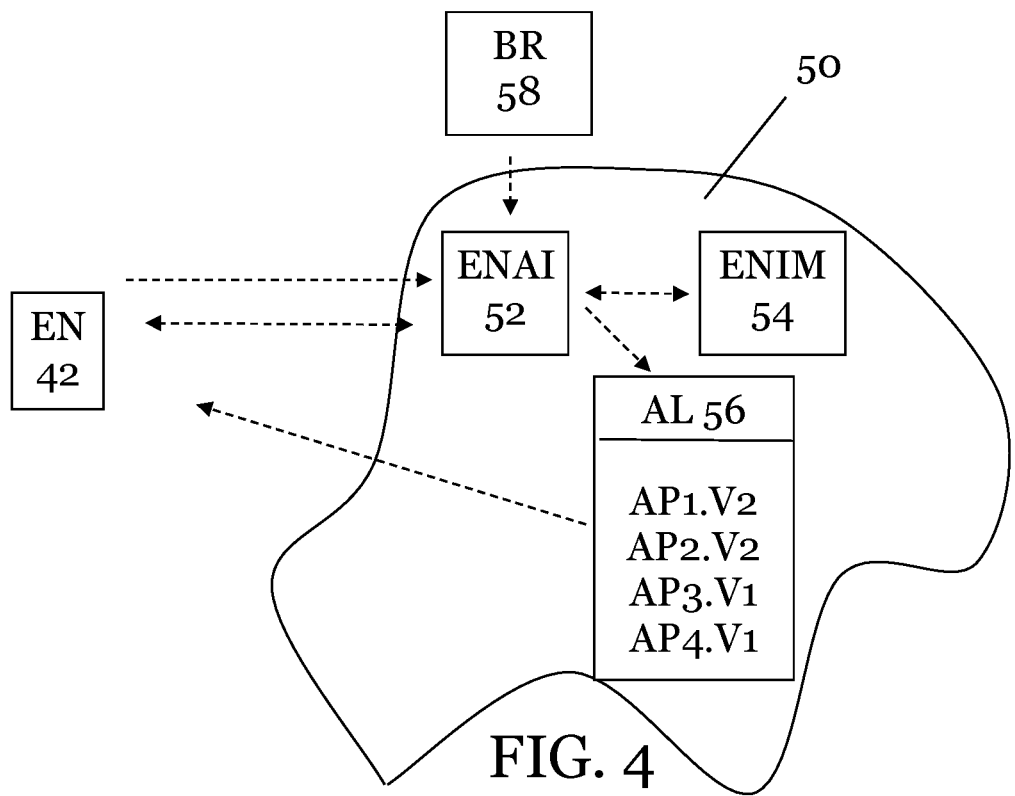

FIG. 4 shows the edge node 42 communicating with an edge node application investigator 52. The edge node application investigator 52 in turn communicates with a browser 58. The edge node application investigator 52 also investigates an edge node information model 54 as well as an application library 56.

The application library 56 is shown as comprising a second version V2 of the first application AP1.V1, a second version of a second application AP2.V2, a first version of a third application AP3.V1 and a first version of a fourth application AP4.V1. The edge node application investigator 52, the edge node information model 54 and the application library 56 are shown as being realized in the cloud 50. They are thereby provided on one or more servers in the cloud and can be accessed by a browser 58 using known accessing techniques, such as based on using a uniform resource locator (URL). It should however be realized that the invention is not limited to cloud computing, but that the elements 52, 54 and 56 can be provided in any local environment, such as for instance in the enlarged process control system.

Figure 5:
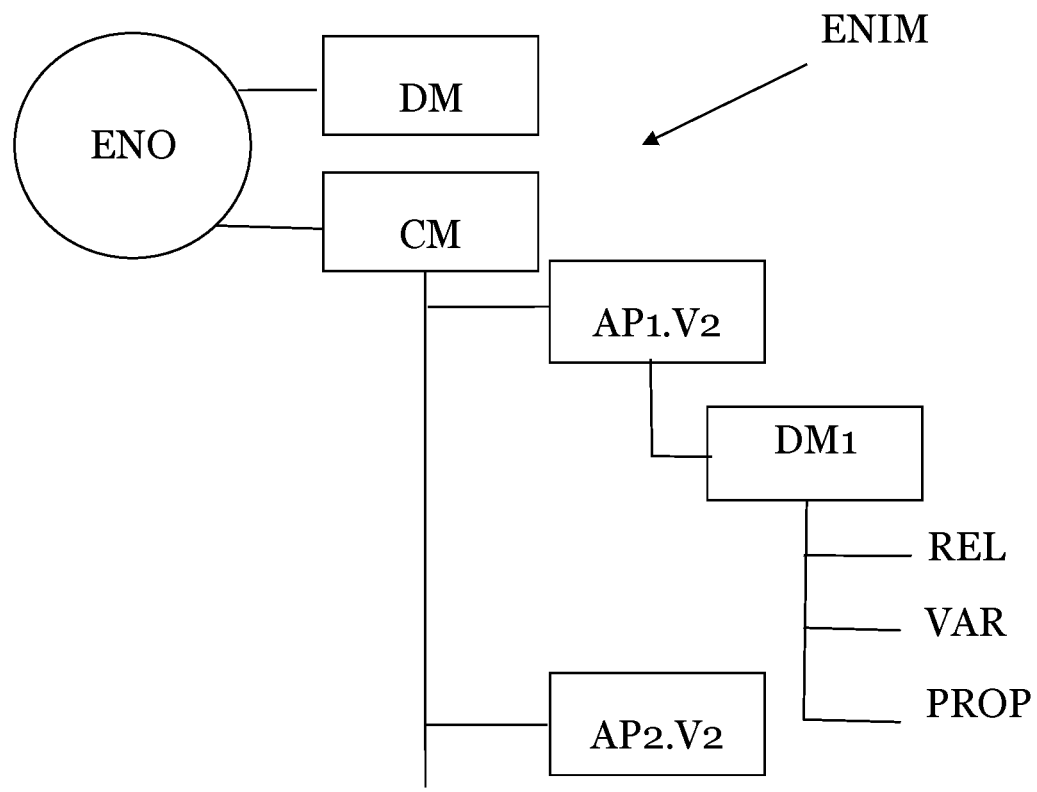

FIG. 5 schematically shows the edge node information model ENIM. The edge node is represented by a digital object forming and edge node object ENO, to which a device model object DM and a configuration model object CM are connected. The device model object DM typically comprises hardware data about the edge node, while the configuration model object CM is related to the software and therefore comprises links to objects representing the applications that are supposed to be used by the edge node. There may therefore be a digital object for every application linked to the edge node object ENO via the configuration model object CM. In this example there is an object AP1.V2 representing a second version of the first application and an object AP2.V2 representing a second version of the second application. Each application object may furthermore comprise at least one data module, where in this case the first application object AP1.V2 has a first data module DM1 and this data module DM1 has a number of types, which types are the types of relations REL, variables VAR and properties PROP. The type variables VAR may define variables of the application, the type relations REL may define relations that the application has to other applications and the type properties PROP may define properties of the application such as version.

Each object may be realized as a JSON file or any similar file such as an XML file. The objects DM, CM, AP1.V1, DM1 and AP2.V2 may thus be provided as JSON files that are linked to each other, where the types REL, VAR and PROP may be definitions in the JSON file of the data model DM1. Thereby the edge node information model ENIM is a model that is based on a data format such as JSON and XML that is open and can be employed by third party developers.

Figure 6:
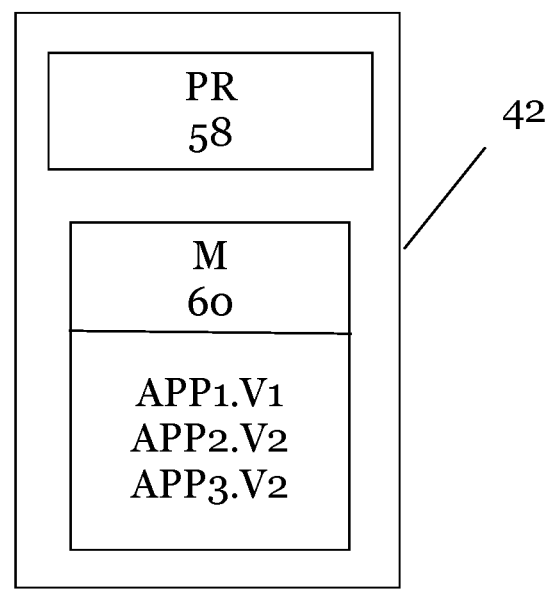

FIG. 6 shows the content of the edge node 42 in some more detail. The edge node 42 comprises a processor PR 58 with a memory 60 and in this memory the applications that the edge node is supposed to run are stored. There is here a first version of the first application AP1.V1, the second version of the second application AP2.V2 and a first version of the third application AP3.V1. Although the applications are shown as being stored in the memory 60 of the edge node 42, it should be realized that these may also be provided in the cloud and that the edge node may run these applications by invoking them in the cloud.

A user may want to update the applications that are running on his or her edge node. A user may for this reason connect to the edge node application investigator 52, which may be done using a browser 58 that the user has access to, such as a browser located on a communication terminal of the user, such as on a desktop or laptop computer or even on a smart phone. There the user may select to have an update of the edge node configuration.

Figure 7:
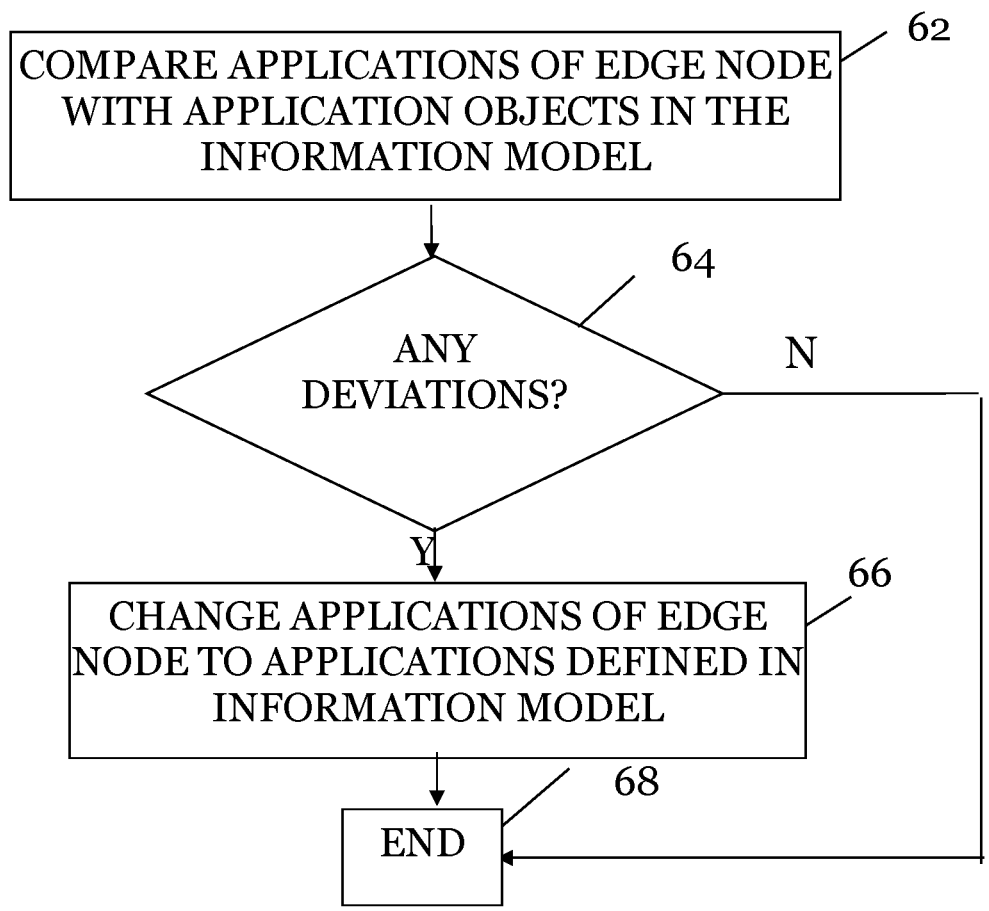
FIG. 7 shows a number of method steps in a first variation of a method being performed in the edge node application investigator.

This may trigger the edge node application investigator 52 to perform an updating of the edge node 42. A flowchart outlining one way in which the edge node application investigator 52 may perform such updating is shown in FIG. 7.

The edge node application investigator 52 thus investigates applications of the edge node with regard to the edge node information model ENIM, which involves an investigation of the applications regarding deviations from the application objects in the information model ENIM. For this reason, the edge node application investigator 52 may connect to the edge node 42 and query which applications and versions of these applications it has. To this query, the edge node may respond with the applications and their versions that can be found in the memory 60. The edge node application investigator 52 may then compare the applications of the node 42 with the application objects in the information model ENIM of the edge node, step 62.

If there is a deviation between the applications of the edge node and the application objects of the information model, step 64, i.e. if at least one application of the edge node deviates from the application object in the information model or if at least one application object deviates from the applications in the edge node, the edge node application investigator 52 then changes the applications provided for being run by the edge node so that they correspond to the application objects of the information model, step 66, i.e. so that they correspond to the applications defined in the information model ENIM. The change may involve adding, deleting, and updating applications in the edge node. An application for which there is no application object may be deleted. For an application object where there is no corresponding application in the edge node, this application may be added. If there was no discrepancy between the applications that were provided for being run by the edge node 42 and the application objects of the information model ENIM, then the method is ended, step 68, which is also the case after any updates have been made.

If there are corresponding application objects for applications in the edge node, the investigation may additionally involve investigating the applications of the node 42 against the corresponding application objects in the information model. If any of these applications is differing, i.e. if at least one application of the edge node deviates from a corresponding application object in the information model, the edge node application investigator 52 then changes the application provided for being run by the edge node so that the application being used by the edge node corresponds to or is aligned with the corresponding application object in the information model. This may involve patching the software module used by the edge node or replacing it with a new software module. The investigation may involve comparing the version numbers of the applications and if there is a difference, then the version indicated by the application object is to be used, which is typically a version that has a higher number than the one in the edge node 42. For this reason, the edge node application investigator 52 may connect to the application library 56 and ensure that, a software module implementing the correct version of the application is transferred to the edge node and installed there. As an example, it can be seen that the version of the first application AP1 in the edge node 42 is the first version V1 that is outdated and therefore the edge node application investigator 52 sees to it that the edge node 42 receives the correct version V2 of the first application AP1 from the application library 56.

It can in this way be seen that updating is performed in a simple fashion with a minimum of involvement by the user. It can also be seen that the user can trigger an update from any location.

Update of an edge node need in fact not even be triggered by a user. It can also be triggered by an application developer deleting an application or placing a new application or a new version of an application in the application library 56. The edge node information models of the nodes using the application may then also be updated, followed by the updating of the edge nodes.

Figure 8:
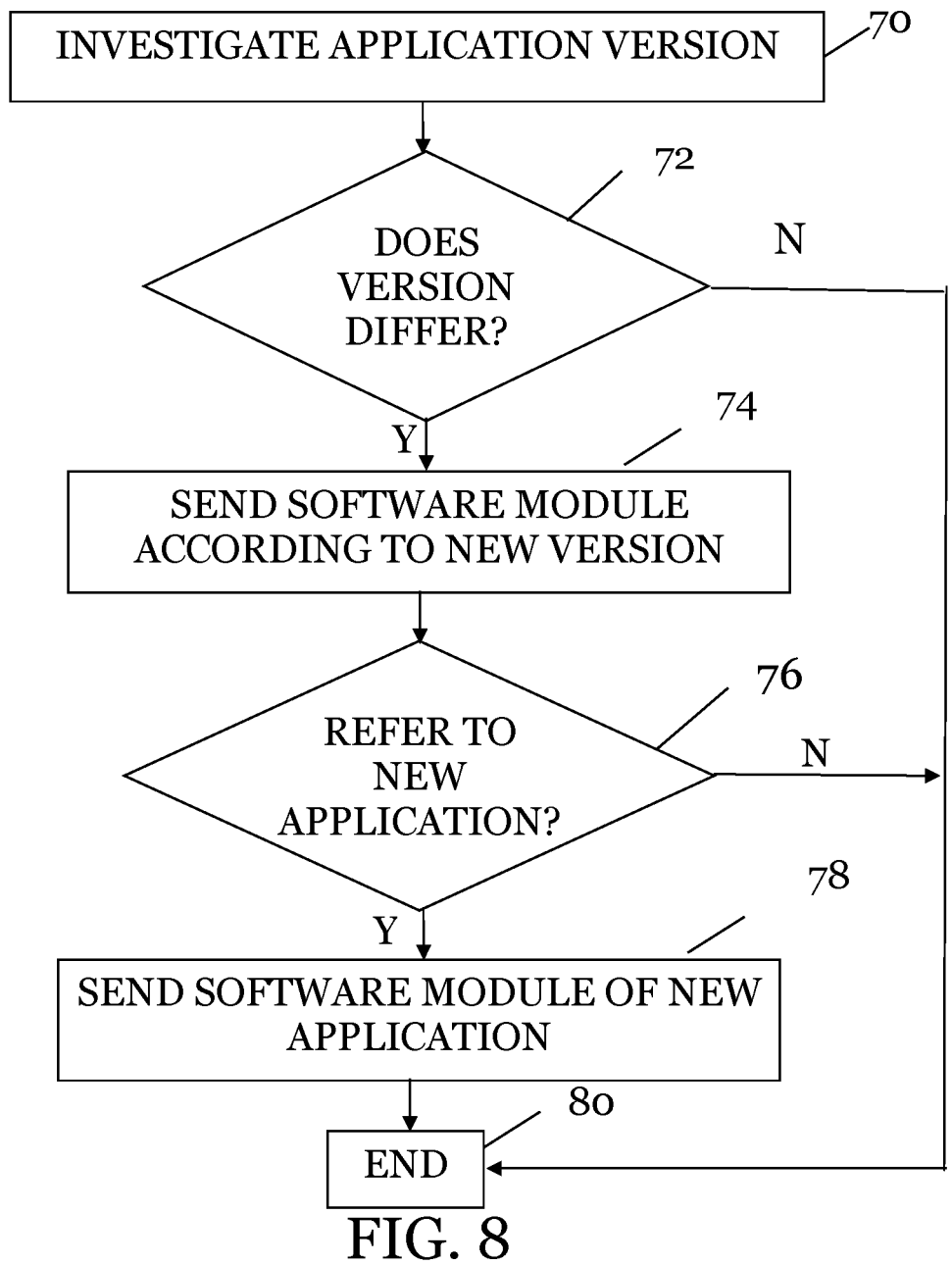
FIG. 8 shows a number of method steps performed by the edge node application investigator for investigating a particular application, FIG. 9 schematically shows one realization of the edge node application investigator as a computer with associated program memory with computer program code for realizing the edge node application investigator functionality, and FIG. 10 schematically shows a computer program product in the form of a CD Rom disc comprising said computer program code for realizing the edge node application investigator functionality.

How the update of an application may be performed when the application deviates from a corresponding application object will now be described in some more detail with reference being made to FIG. 8. It is possible that such an updated application, for instance one that has a new version, is dependent on another application that the previous version was not. This situation may also have to be addressed.

For an application, such as the first application AP1, the edge node application investigator 52 investigates the version of the application that is to be run by the edge node 52 with regard to the version defined in the corresponding application object in the information model, step 70. It then investigates if the versions differ, and if they do, step 72, then a software module according to the new version is sent to the edge node 42, step 74. If the versions do not differ, step 72, then the investigation is ended, step 80.

If there was a new version of the application, the edge node application investigator 52 then investigates if this new version refers to a new application. This can be the case if the application object defines a relation to another application. The edge node application investigator 52 thus investigates if the relation is new, i.e. if the new version of the application refers to another application, which the previous version did not. The previous version did thus not refer to this other application. The reference to another application may for instance be made in the type relation of the data module of the application object.

If the new version referred to a new application, step 76, then the edge node application investigator 52 ensures that the software module of the new application is also provided to the edge node, which may be done through sending the software module of the new application to the edge node, step 78. It thus provides the other application for being run by the edge node if the relation is new. Thereafter the investigation is ended, step 80, which also takes place if there was no reference to a new application.

If as an example the first application AP1 being run by the edge node 42 was again the old version, here the first version V1 of the first application AP1, then the investigation of the application object AP1.V2 reveals that the correct version is the second version V2, which may be reflected in the properties PROP of the first data module DM1. An investigation of the relations REL of the same data module DM1 may then reveal that the application now has a relation to the fourth application AP4 and therefore both the second version of the first application AP1.V2 and a first version of the fourth application AP.V1 is transferred to the edge node 42.

This may be done if the fourth application processes the local measurement data from the local measurement device. The first application may then process the data concerning object O1 based on this measurement data, which may as an example be used to determine when to perform maintenance of the corresponding real-world object. This determined maintenance data may in turn be used as a trigger for stopping the process control in the core process control system for having the maintenance performed. When maintenance is to be performed, the process control may then be stopped in an orderly fashion in the core process control system.

It may be important that the application is not allowed to influence the actual control being performed in the core process control system. The application may thus not be allowed to influence steady-state operation of the core process control system. For this reason, the digital object control unit may keep generated data that is related to steady-state operation of the process from entering the core process control system. The edge node, for instance the digital object control unit of the edge node, may therefore stop data generated by the application from entering the core process control system when this data is related to steady-state operation of the process. It should be realized that this type of influence inhibiting may also apply for fault handling.

It can be seen that edge computing, realized through the edge node, has been introduced in the process control system, which is an industrial control system.

Edge computing in the industrial control system domain provides an overall solution for deployment of industrial software applications either near the source on the edge node(s) or in the cloud thus enabling edge and cloud computing capabilities for the industrial control system. Edge nodes enable a Software as a Service (SaaS) centrally managed hosting and delivery model, via the cloud, to a fleet of edge nodes installed on premise and integrated with the industrial control system and the fleet of the connected devices.

An edge application comprises one or more edge software modules that interact with other edge modules via an edge runtime platform. An edge module is software that provides a service compliant with a set of defined rules. The application composition, requirements, dependencies etc. may be described in an application model. Edge applications may be managed by the end user via a cloud service.

An edge node is in turn a computer connected to and consuming data from the industrial control system, i.e. from the previously mentioned core process control system. The edge node provides a cloud connected software platform for applications to run near the industrial control system (edge computing).

A cloud-based service for installation, configuration, and management of applications on a fleet of edge has been described where edge software is used that can maintain (add, update, remove) the edge applications by monitoring the information model associated with the edge node.

The modified process control object may be created using an ability platform. The ability platform may with advantage be provided in the cloud together with the edge node application investigator. The ability platform may be provided based on Open Platform Communication Unified Architecture (OPC UA) technology, where the edge node information model and application library may be provided by an OPC UA server. The digital object control unit, and the first application may additionally comprise connection modules, which may also be provided using the OPC UA technology.

The ability platform provides information model services and edge configuration services that can be used to implement a centrally hosted engineering tool or AP1 to provide engineering tools, such as SaaS.

This provides a multi-tenant Platform as a Service (PaaS) to implement globally always available connectivity engineering tools from a central cloud deployment.

The information of what a connect module should expose and how to map this information may be defined using a Connect engineering tool, which may be centrally located, for instance at the edge node application investigator, and the resulting configuration data may be stored in the ability platform and associated with the edge connect module.

A connect module may subscribe to the configuration data, such as modified data object, and receive configuration data updates when the tool publishes changes.

The configuration data may be security stored in the cloud, either as part of the information model (config models) and could optionally also contain configuration files.

The UA engineering tool allows a user to discover and list OPC UA Servers via a UA Connect client.

The UA Engineering tool may request node set files for each UA Server, where a node set file may be a JavaScript file with JSON format or an XML file with a modified first process control object. The files may be cached in a File Storage service, for each connected UA Server, with UA Server address space version information. This means that the above-mentioned database provides a file storage service for the above-described modified process control object and the object may be stored in an associated UA Server address space.

Nodeset files, for instance of the JSON format or XMI type, can also be imported to the UA Engineering tool for providing offline engineering capabilities.

A user can perform mapping of UA Object types to Ability Types. Mapping can be one to one (auto) or more complex re-shaping of types.

The user may select a subset of the UA Server's address space to map to information object models and then define data collection configuration for the mapped information.

The configuration may then be stored in information module per mapped object instance with UA type, UA instance mapping and data collection information.

For a cloud (central point) hosting, the engineering tool is capable of configuring a fleet of edge nodes, each with a set of connected OPC UA data sources, where the digital object control unit may provide such a data source delivering data to the first application.

An edge node may be continuously connected to the UA engineering tool, or it may be connected on demand.

For a continuously connected edge node, the cloud hosted UA Engineering tool can be used directly to configure OPC UA mapping and data collection.

For edge nodes that get connected on demand, the UA Engineering tool may be hosted on the Edge node and can be used by any computer connected to a local LAN network in which the edge node is provided.

Support for export/import of mapping between cloud and local edge node could be added if needed.

Once configured a data stream can be established between the OPC UA data source and the application that subscribes to the data. The mapped data may be forwarded to the edge applications (in context of mapped to object models) and optionally also forwarded to cloud applications using the same mapped object model context.

The UA Connect client associated with the application, such as the UA Connect client of the first application subscribes for data as defined in the configuration. Data is published to the edge platform using the defined mapping.

The information models and the associated runtime data is made available to other edge applications via the edge platform.

Data can be published to cloud platform if desired (configuration of edge data routing).

UA Connect is agnostic to Edge connection model.

The mapping and runtime data publishing principles may be applied both to UA client server mode and UA publish/subscribe mode.

The mapping and runtime data publishing principles are applied both to UA client server mode and UA publish/subscribe mode.

The invention has a number of advantages. It provides a simple and flexible model that allows customers to install and upgrade individual applications that adds capabilities to an Industrial Control System without affecting the Core Industrial Control System.

This allows the applications to be developed and evolved with a fast pace, disconnected from the lifecycle of the Core Industrial Control System. Capabilities can be added without affecting other capabilities.

Figure 9:
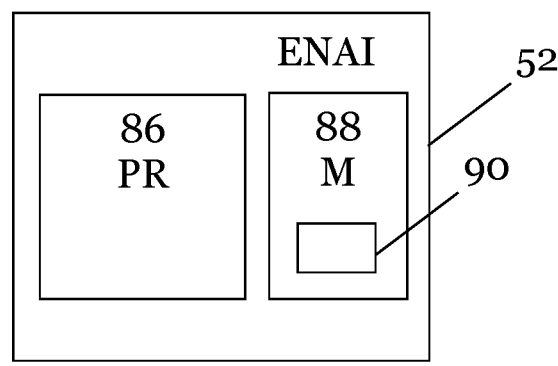
Figure 10:
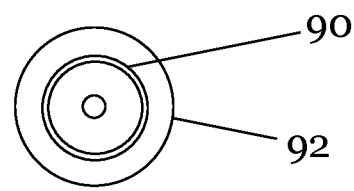

The edge node application investigator 52 may, as can be seen in FIG. 9, be provided in the form of one or more processors PR 86 together with computer program memory M 88 including computer program code 90 for performing its functions. This computer program code may also be provided on one or more data carriers which perform the functionality of the edge node application investigator when the program code is being loaded into a computer forming the edge node application investigator. One such data carrier 92 with computer program code 90, in the form of a CD ROM disc, is schematically shown in FIG. 10. Such computer program may as an alternative be provided on another server and downloaded therefrom into the edge node.

The invention claimed is:

1. A method for updating an edge node of a process control system, the method being performed by an edge node application investigator and comprising:

comparing applications of the edge node with one or more application objects in an information model for the edge node, said information model representing the edge node as an object to which the one or more application objects are linked and said application objects representing applications that are supposed to be used by the edge node, and changing the applications of the edge node, if there is a deviation between the applications of the edge node and the application objects of the information model, so that the applications of the edge node correspond to the application objects of the information model, wherein the changing of the applications of the edge node comprises updating an application edge node that deviates from a corresponding application object in the information model, so that it is aligned with the corresponding application object in the information model, wherein at least one application object that deviates from a corresponding application defines a relation to another application and further comprising investigating if the relation is new and providing the other application for being run by the edge node, if the relation is new.

2. The method according to claim 1, wherein the application is provided as a software module for being run by the edge node, and wherein the updating comprises patching the software module.

3. The method according to claim 1, wherein the application is provided as a software module for being run by the edge node, and wherein the updating comprises replacing the software module with a new software module.

4. The method according to claim 1, wherein the application object defines a number of types, where one type is relations, where the investigating of if the relation is new comprises investigating the type relations.

5. The method according to claim 1, wherein the edge node information model is based on a JavaScript Object Notation data format.

6. The method according to claim 1, wherein at least one of the applications of the edge node is provided as a software module for being run by the edge node.

7. An edge node application investigator for updating an edge node of a process control system, the edge node application investigator comprising a processor and memory, said memory comprising computer instructions executable by said processor, whereby said edge node application investigator is operative to:

compare applications of the edge node with one or more application objects in an information model for the edge node, said information model representing the edge node as an object to which the one or more application objects are linked and said application objects representing applications that are supposed to be used by the edge node, and change the applications of the edge node, if there is a deviation between the applications of edge node and the application objects of the information model, so that the applications of the edge node correspond to the application objects of the information model, wherein said changing the applications of the edge node comprises said edge node application investigator being operative to update an application of the edge node that deviates from a corresponding application object in the information model, so that it is aligned with the corresponding application object in the information model, wherein at least one application object that deviates from a corresponding application defines a relation to another application and the edge node application investigator is further operative to investigate it the relation is new and provide the other application for being run by the edge node if the relation is new.

8. The edge node application investigator according to claim 7, wherein the application is provided as a software module for being run by the edge node, and wherein the updating comprises patching the software module.

9. The edge node application investigator according to claim 7, wherein the application is provided as a software module for being run by the edge node, and wherein the updating comprises replacing the software module with a new software module.

10. The edge node application investigator according to claim 7, wherein the application object defines a number of types, where one type is relations, where the investigating of if the relation is new comprises investigating the type relations.

11. The edge node application investigator according to claim 7, wherein the edge node information model is based on a JavaScript Object Notation data format.

12. The edge node application investigator according to claim 7, wherein at least one of the applications of the edge node is provided as a software module for being run by the edge node.

13. A process control system comprising an edge node and an edge node application investigator for updating the edge node, the edge node application investigator being configured to:

compare applications of the edge node with one or more application objects in an information model for the edge node, said information model representing the edge node as an object to which the one or more application objects are linked and said application objects representing applications that are supposed to be used by the edge node, and change the applications of the edge node, if there is a deviation between the applications of edge node and the application objects of the information model, so that the applications of the edge node correspond to the application objects of the information model, wherein said changing the applications of the edge node comprises said edge node application investigator being operative to update an application of the edge node that deviates from a corresponding application object in the information model, so that it is aligned with the corresponding application object in the information model, wherein at least one application object that deviates from a corresponding application defines a relation to another application and the edge node application investigator is further operative to investigate it the relation is new and provide the other application for being run by the edge node if the relation is new.

14. The process control system according to claim 13, further comprising a core process control system comprising a process control server communicating with the edge node.

15. The process control system according to claim 14, wherein the edge node is operative to keep data generated by the applications related to steady-state operation of the process from entering the core process control system.

16. A computer program product for updating an edge node of a process control system, said computer program product comprising a non-transitory data carrier with computer program code configured to cause an edge node application investigator to, when said computer program code is loaded into said edge node application investigator:
  compare applications of the edge node with one or more application objects in an information model for the edge node, said information model representing the edge node as an object to which the one or more application objects are linked and said application objects representing applications that are supposed to be used by the edge node, and
  change the applications of the edge node, if there is a deviation between the applications of edge node and the application objects of the information model, so that the applications of the edge node correspond to the application objects of the information model,
  wherein said changing the applications of the edge node comprises said edge node application investigator being operative to update an application of the edge node that deviates from a corresponding application object in the information model, so that it is aligned with the corresponding application object in the information model,
  wherein at least one application object that deviates from a corresponding application defines a relation to another application and the edge node application investigator is further operative to investigate it the relation is new and provide the other application for being run by the edge node if the relation is new.

17. The method according to claim 1, wherein before the step of comparing, the method comprises:
  querying the edge node about the applications and versions of the applications that the edge node has; and
  receiving a response to the query comprising the applications and the versions of the applications.

18. The method according to claim 1, wherein said information model is provided by a server distinct from the edge node.

19. The method according to claim 18, wherein the server which provides said information model is an Open Platform Communication Unified Architecture (OPC UA) server.

20. The edge node application investigator according to claim 7, wherein said information model is provided by a server distinct from the edge node.

21. The process control system according to claim 13, wherein said information model is provided by a server distinct from the edge node.

22. The computer program product according to claim 16, wherein said information model is provided by a server distinct from the edge node.

* * * * *